United States Patent [19]

Frischmuth et al.

[11] Patent Number: 4,469,496
[45] Date of Patent: Sep. 4, 1984

[54] MEANS FOR SEPARATING ISOTOPES OF HYDROGEN BASED ON THE PRINCIPLE OF GAS CHROMATOGRAPHY

[75] Inventors: Hans Frischmuth; Jürgen Perchermeier, both of Garching; Anton Stimmelmayr, Marzling; Heinrich Weichselgartner, Munich, all of Fed. Rep. of Germany

[73] Assignee: Max-Planck-Gesellschaft zur Foerderung der Wissenschaften e.V., Goettingen, Fed. Rep. of Germany

[21] Appl. No.: 555,991

[22] Filed: Nov. 29, 1983

[30] Foreign Application Priority Data

Nov. 30, 1982 [DE] Fed. Rep. of Germany ....... 3244325

[51] Int. Cl.$^3$ ............................................. B01D 15/08
[52] U.S. Cl. ......................................... 55/197; 55/67; 55/68; 55/267; 55/386
[58] Field of Search ...................... 55/67, 68, 74, 386, 55/197, 387, 208, 267–269

[56] References Cited

U.S. PATENT DOCUMENTS 2,863,526 12/1958 Salmon .
4,276,060 6/1981 Aldridge ................................. 55/67

FOREIGN PATENT DOCUMENTS 1478542 of 0000 France .
825934 of 0000 United Kingdom .

OTHER PUBLICATIONS

"A Pilot Plant for the Recovery and Separation of Tritium from the Spent Fuel of Fusion Experiments", H. Frischmuth et al., Achema-82-20.
"Evaluation of Large-Scale Gaschromatography for the Recovery and Separation of Tritium from the Exhaust of Tritium-Burning Tokamak Fusion Experiments", J. Perchermeier et al.

Primary Examiner—John Adee
Attorney, Agent, or Firm—Brumbaugh, Graves, Donohue & Raymond

[57] ABSTRACT

The invention describes a means for separating isotopes of hydrogen which is based on the principle of gas chromatography and is suitable for separating large amounts of hydrogen as is necessary for fusion experiments. The substantially higher throughput in comparison to that of other analysis devices based on gas chromatography is rendered feasible by the fact that the packings of the separation columns and the collectors for absorbing the separate species contain inert additives which ensure even distribution of the gas flow.

14 Claims, 3 Drawing Figures

MEANS FOR SEPARATING ISOTOPES OF HYDROGEN BASED ON THE PRINCIPLE OF GAS CHROMATOGRAPHY

BACKGROUND OF THE INVENTION

This invention concerns a means for separating isotopes of hydrogen contained in a gas mixture based on the principle of gas chromatography, comprising a flow passage for a carrier gas containing a feed pump, at least one separation column with a packing, including a fine-grained active separation material, at least one collector which is controlled so as to be switched on by a valve arrangement, with a packing of a hydrogen-absorbing material, and a valve arrangement for controlling the separation process.

Tokamak fusion experiments on the scale of TFTR or JET will have a daily throughput in tritium operation amounting to some thousand Curies (Ci) of tritium ($T_2$) serving as a reactor fuel. Only a small amount of this tritium is "burned"; the largest portion (above 90%) can be used again. However, before doing so it is necessary to clean this reactor fuel and to separate the light hydrogen and its compounds, i.e. $H_2$, HD and HT, and to recover the isotopes $D_2$ and $T_2$ and the compound DT in a pure state and in large amounts (a few standard liters per day). In other fields of technology the need arises to recover small amounts of a certain isotope of hydrogen from a surplus of another isotope of hydrogen or another gas.

There are various processes for separating isotopes of hydrogen. In practical operation, low-temperature distillation is suitable only for separating large amounts of hydrogen isotopes; the throughput of expedient units is $10^3$ times higher than that required for the above-mentioned experiments and the dead stock in the cryogenic columns is above $10^5$ Ci. Diffusion processes require high expenditure because the separating factor per stage is only about 2. Bipolar electrolysis with a separation factor between about 4 and 8 is still in the development stage.

Gas chromatography for separating isotopes of hydrogen has heretofore only been used for analytical purposes. All isotopes of hydrogen and their compounds can be quantitively separated by means of suitable prior art analysis devices based on gas chromatography. However, the throughput is only in the region of a few microliters and reaches a maximum of about one-tenth of a milliliter. It is already known (from "FUSION TECHNOLOGY", 1980, Pergamon Press Oxford and New York, pp. 571–577 and "ACHEMA-82-20. Ausstellungstagung für chemisches Apparatewesen" from 6 to 12 June 1982 in Frankfurt) to use gas chromatography on a larger scale for separating isotopes of hydrogen.

BRIEF DESCRIPTION OF THE PRIOR ART

British patent specification No. 825,934 describes a method for separating deuterium ($D_2$) from a mixture of $H_2$, HD and $D_2$ which has come to be known as the "displacement method". The hydrogen isotopes are separated isotopically in palladium which is contained in a separation column as a powder mixed with asbestos fibres at a weight ratio of 10:3. The asbestos serves as an inert carrier for the metal powder. The palladium catalyses the conversion of the molecule HD into the molecules $H_2$ and $D_2$ during constant flushing with $H_2$. Thus it does not relate to the separation of $H_2$, HD and $D_2$ but rather to the recovery of $D_2$ from the gas mixture; the molecule HD disappears completely and the originally present $H_2$ mixes with the surplus of the $H_2$ flush gas. The displacement method can therefore only be used for enriching a component of a mixture but not for quantative separation of the initial mixture. A further serious drawback of this prior art is that the displacement gas $H_2$ has to be desorbed again after each experiment before the separation column can be used again.

French Pat. No. 1,478,542 describes a process for separating isotopes of hydrogen by reverse flow enrichment. This process operates on the basis of moved adsorption layers and a displacement gas (e.g. $N_2$).

U.S. Pat. No. 2,863,526 is a fractionating enrichment process for separating hydrogen isotopes in which the hydrogen isotopes are absorbed at room temperature in palladium and then desorbed again at an increased temperature. Palladium beds are used for absorption. In the palladium beds the palladium is mixed with quartz sand. The serious problem of so-called peak uncertainty associated with chromatographic processes does not occur in this process.

SUMMARY OF THE INVENTION

It is the object of the present invention to provide a means for separating hydrogen isotopes and their compounds based on the principle of gas chromatography, which enables the separation of large sample charges with a high separation factor and which is capable of storing the separated isotopes and their compounds.

A more even throughput across the whole cross section of the separation column is achieved and the formation of a passage is avoided by the fact that the separation column contains inactive fillers in addition to the active substance, preferably aluminium oxide. About 500 milliliters of a mixture of hydrogen isotopes can be separated per charge and a substantial (above 99.9%) separation of $D_2$, DT and $T_2$ is ensured with a weekly throughput of about 25 standard liters or about $10^4$ Ci of $T_2$. Thus a simple method is provided for quantative re-use of the "fusion fuel" DT and $T_2$. By means of special features of the absorption means, in particular the use of relatively coarse fillers comprising a material of sufficient heat conductivity, e.g. stainless steel, substantial absorption of desired separated species of isotopes can be achieved from a plurality of subsequent separation processes.

The means of the invention may be used generally for cleaning, separating, enriching and storing hydrogen isotopes, e.g. for recovering hydrogen isotopes mixed in another gas, e.g. an inert gas, or for recovering small amounts of another hydrogen isotope.

BRIEF DESCRIPTION OF THE DRAWINGS

Embodiment examples of the invention will now be described in more detail with reference to the drawing, in which.

DETAILED DESCRIPTION OF THE PREFERRED EMBODIMENT

Figure 1:
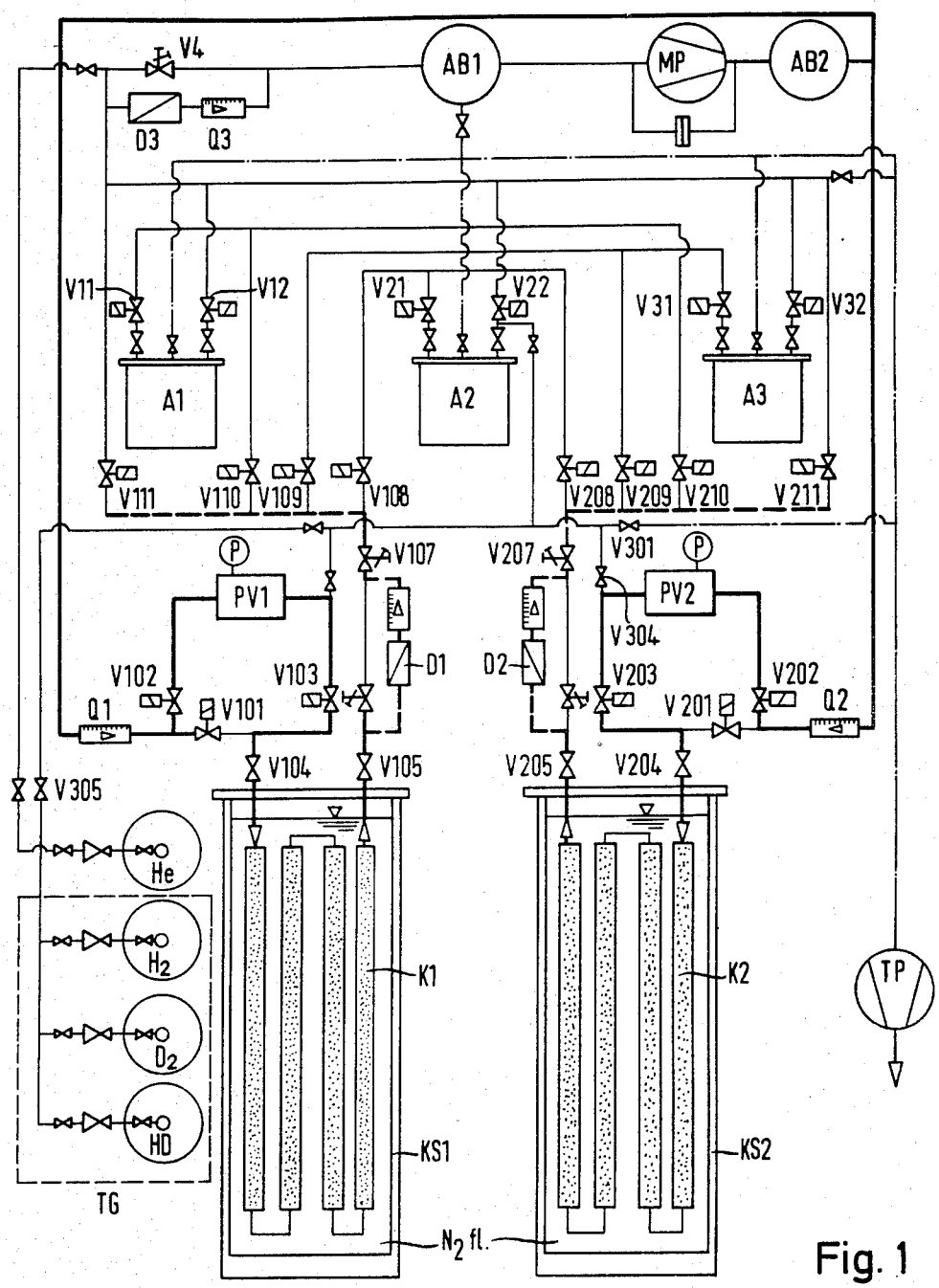
FIG. 1 is a schematic view of a means for separating hydrogen isotopes and their compounds based on the principle of gas chromatography which can be used for accomplishing the invention.
Figure 1A:
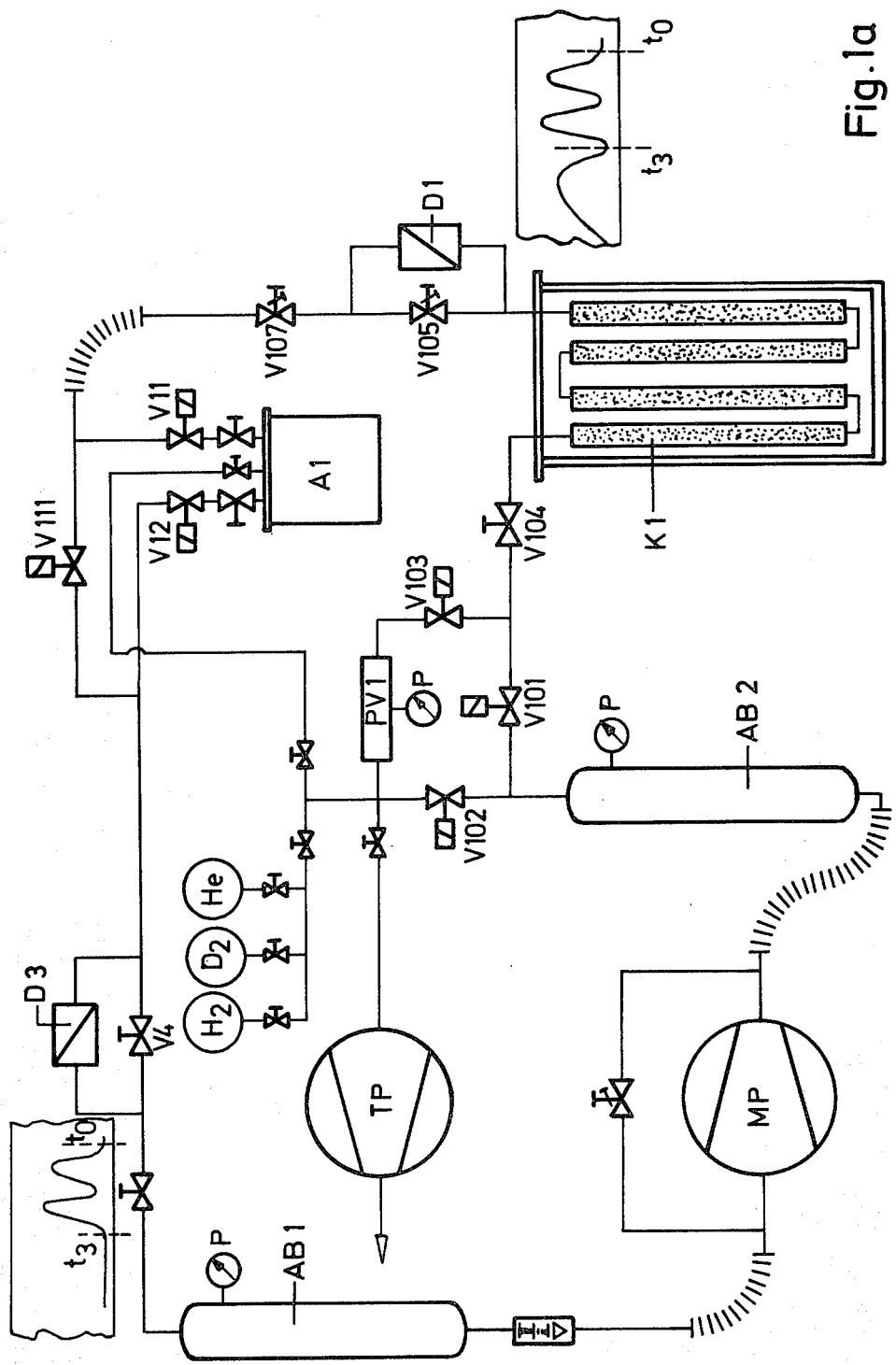
FIG. 1a shows a portion of the device according to FIG. 1.

An embodiment example of a preferred means for separating hydrogen isotopes and their compounds based on the principle of gas chromatography is shown in FIG. 1. For the sake of simplicity, FIG. 1a shows a portion of this means which is active in the separation process. The illustrated means contains a circulation system for a carrier gas, in particular helium. The carrier gas circulation system contains a diaphragm-type compressor MP, upstream of which a buffer volume AB1 is arranged and downstream of which a second buffer volume AB2 is arranged. The buffer volumes serve to smooth pressure knocks which might otherwise occur when introducing the gas mixture to be separated and when reversing valves.

The carrier gas circulation systems branch off from the outlet of the buffer volume AB2 into two optionally switchable branches, each of which contains a flow meter Q1 and Q2 respectively, a sample volume PV1 and PV2 respectively, a separation column K1 and K2 respectively and a hydrogen isotope detector D1 and D2 respectively and also a number of valves and bridge connections, the arrangement of which can be seen in FIGS. 1 and 1a and the function of which will be explained hereinafter in greater detail.

The carrier gas circulation system continues from the outlet side of the detectors D1 and D2 respectively via a further valve arrangement on to one of three collectors A1, A2 and A3 which are optionally switchable. The circulation system continues from the outlet of the switched collector via a further hydrogen isotope detector D3 and a further flow meter Q3 to the inlet side of the buffer volume AB1.

Pressure gauges P are arranged at various points as shown in the drawing. Four gas containers TG, which contain helium, $H_2$, $D_2$ or HD and which communicate with the means in the manner as shown by way of pressure reducing valves and check valves, are provided for supplying carrier gas to the means and for filling the sample volumes PV with a test gas mixture. A further pump TP is provided for evacuating the means and for pumping off the separated isotopes.

The tritium-proof double membrane compressor MP constantly pumps the carrier gas flow at a throughput of 10 l/min, for example. A given amount of the gas mixture to be separated, which may be of optional composition as regards the hydrogen isotopes, is injected in a single "pulse", i.e. as a compact gas stopper, via the calibrated sample volumes PV1 or PV2 into the circulating carrier gas which preferably comprises highly pure (approx. 99.999% pure) helium. This pulse or gas stopper then passes from the sample volumes PV1 or PV2 with the carrier gas flow through the passage (heavily lined in the drawing) into the separation columns K1 or K2. Each separation column comprises four subsections which are connected in series and each of which has a cleading 12 made of copper piping with a wall thickness of 2 mm, an internal diameter of 50 mm and a length of 750 mm. Thus each separation column K has an overall length of 3000 mm. The filling in the separation columns comprises a pre-treated $Al_2O_3$ powder 14 and each column is arranged in a cryostatic temperature regulator KS1 or KS2 which is filled with liquid nitrogen. The gas pressure in the separation column is preferably above atmospheric pressure and may, by way of example, amount to between 2 and 5 bars, preferably 3 bars.

The separation of the individual hydrogen isotopes and hydrogen isotope compounds now takes place in the switched on column K1 or K2 because of succeeding adsorption and desorption processes occurring at the boundary layer between the aluminium oxide filling and the carrier gas flow.

After leaving the column the separated species are registered by means of the gas-tight or tritium-tight helium ionisation detector D1 or D2. One or other, or all of the isotopes or isotope compounds can now be "cut out" individually from the carrier gas flow, depending on the specific requirements. The collectors A1 to A3 used for this purpose are preferably made of stainless steel and are filled with a reactive metal or a reactive metal alloy which is capable of absorbing hydrogen in sufficient amounts and sufficiently quickly. The collector provided for absorbing a given isotope is switched on by activating the appropriate valves in the carrier gas flow when the desired isotope or the desired compound leaves the separation column. The valves may be automatically operated by the detector signal or in accordance with a separation time which is characteristic of and constant for each isotope and each compound.

The passage of flow of the carrier gas containing the separated species from the column K1 or K2 to the valves, which allow the carrier gas to be discharged to a desired collector, is indicated by a broken line in FIG. 1. In the means according to FIG. 1 three collectors A1, A2, A3 are shown which may be opened by means of the illustrated valve arrangement to optionally communicate with one of the carrier gas currents.

The further detector D3 arranged behind the respective open collector is for monitoring purposes and will no longer record the isotope absorbed by the collector if the means is functioning properly. From detector D3 the carrier gas flows via AB1 back to the membrane compressor MP.

Since the sample volume is larger by the factor $10^4$ than in the case of gas chromatography separation processes, particular attention must be devoted to the process parameters which directly influence the sample amount. These are the following:

The cross section of the column: the sample volume can be increased with increasing cross section of the stationary phase, i.e. the cross section of the separation column. At the same time the separation efficiency is affected, however. Circular cross sections with a diameter of about 40 to 60 mm, in particular 50 mm, are recommended.

The length of the column: the separation efficiency increases with increasing length of the column, but the separation time also increases. The total length of the column may amount to between 2000 and 5000 mm; 3000 mm has proved to be an expedient length.

The carrier gas velocity: an increase in the carrier gas velocity shortens the separating time, but also the separation efficiency. A value in the magnitude of 10 l/m has turned out to be satisfactory in the embodiment example described.

The separation material: the active separation material, i.e. the stationary phase in the separation column, which may comprise special molecular sieves (zeolites), porous polymers, activated carbon or complex polymer molecular sieves and special pre-treated aluminium oxides, has a decisive influence both on the sample volume and on the separation efficiency. A preferred material is ordinary commercial gamma-$Al_2O_3$ which has been treated in a special manner and which has preferably a granulation value of about 60 to 210 microns. The grain distribution is in keeping with the normal distribution with a maximum (70%) at approximately 140 microns.

The separation activity of the aluminium oxide, which can be described in terms of its polarity depends on the water content and can be seen in a chromatogram in the form of peaks. If the separation substance is completely free of water, the retention period of the individual species increases sharply, which means that the column is too active and retains the molecules to too great an extent, the result being an undesirably long separation period for the charges.

In order to effectively prevent lateral diffusion in the filling, enrichment or "nests" caused by cavities, concentration shifts due to various packing densities and similar adverse affects, the filling has to be packed evenly, both over the cross section of the column and over the length of the column. If it is packed too tightly, the result will be too high a carrier gas pressure which will give rise to longer separation periods.

These problems are solved by adding about 0.5 to 1 percent by weight of $SiO_2$ fibres 16, which preferably have a mean diameter of 0.1 mm and a mean length of 2 mm. This addition renders it possible to distribute the aluminium oxide evenly in the packing using medium pressure. In addition, the activity of the aluminium oxide is optimized by having the water content of the aluminium oxide at about 1 percent by weight. This can be done in the described embodiment example by heating the separation column for 72 hours at 410° C. in a flow of helium (approximately 50 l/min). The above-mentioned disturbances can be thus avoided and the sample volume can be substantially increased.

The temperature of the separation material: to separate hydrogen isotopes it is generally necessary to cool the separation column, e.g. to the temperature of liquid nitrogen (approx. 77K). It must be ensured that the temperature over the column cross section is as even as possible; in particular the heat added along with the carrier gas current must be discharged quickly through the walls of the column. For this reason, a wall material which affords high heat conductivity, in particular copper, is used.

The detectors: ionisation detectors are used for monitoring the separated isotopes. The ordinary commercial He ionisation detectors are, however, neither high vacuum-tight nor diffusion-tight. The detector has therefore been arranged in a tritium-proof stainless steel housing with ultra-high vacuum-tight high-tension feed-throughs.

Collectors: it is known that, for example, uranium in its pyrophorous state or the alloy Zr/Al when cold can absorb large amounts of hydrogen, e.g. in the case of uranium when the compound $UH_3$ is formed. The process of binding hydrogen by metals or metal alloys has heretofore only been applied in stationary operation, i.e. the hydrogen is passed over the respective metal and one waits until the amount of hydrogen is bound which corresponds to the temperature and pressure applied. Such a process is, however, not suitable for the described separation means since the hydrogen isotopes have to be removed as completely as possible from the flow of helium at a pressure of up to 3 bars and a carrier gas velocity of approximately 10 l/min. With the volume of the container amounting to 0.5 liters, the above-mentioned flow velocity would result in a twenty-fold gas exchange per minute.

Figure 2:
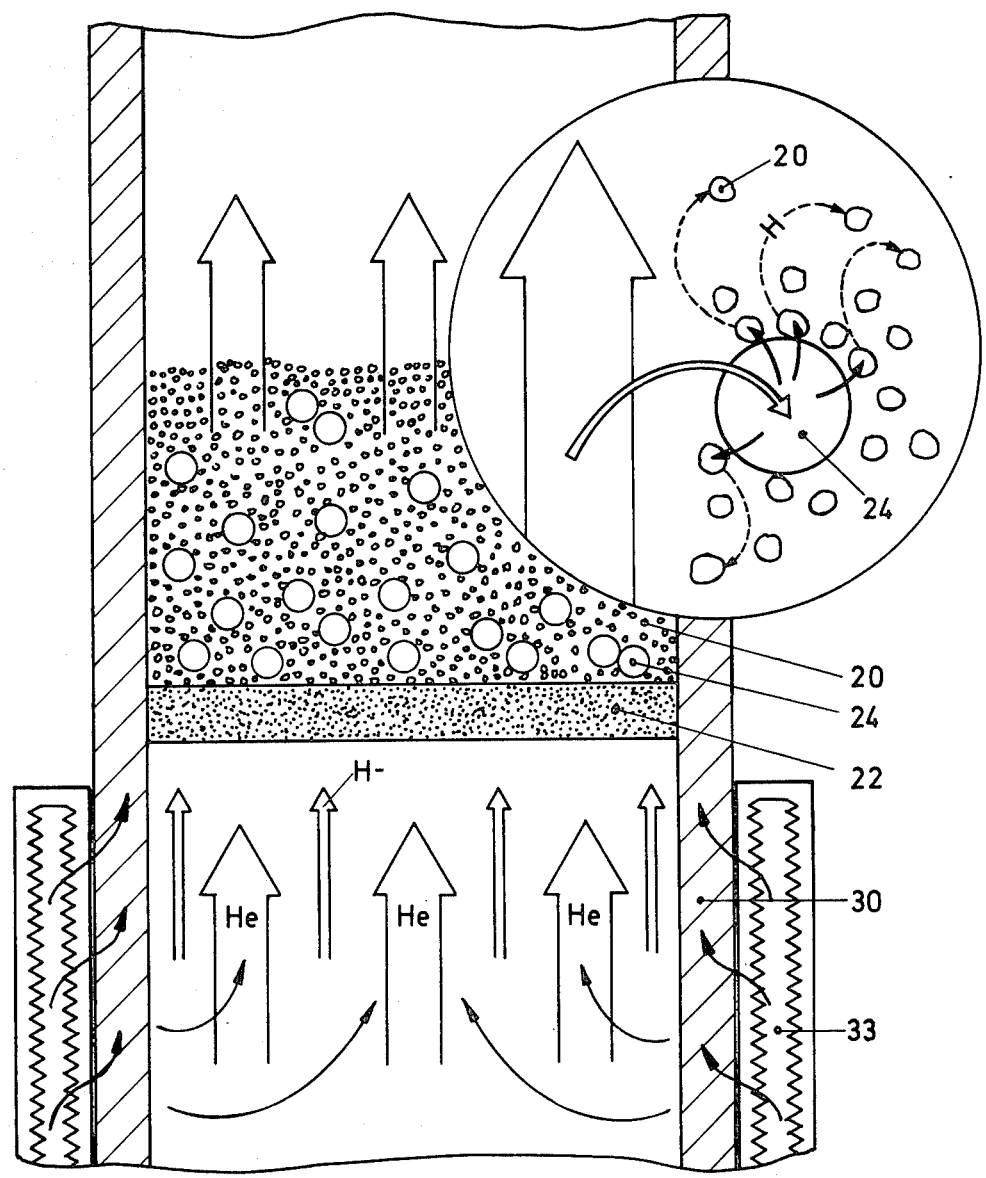
FIG. 2 is a sectional drawing of a means for absorbing a separated isotope.

In a preferred embodiment of the collectors A1 to A3 600 g of pyrophorous uranium powder 20 were loosely arranged in three levels over frits made of stainless steel which are closely welded to the housing. An enlarged schematic view of this embodiment is shown in FIG. 2 in the case of a frit 22. Due to the relatively high flow velocity of the carrier gas containing the hydrogen isotopes in the uranium powder, due to local overheating during hydrogen absorption and due to partial sintering of the powdered uranium, there is a danger that a passage might be formed in the uranium powder mass. To avoid this, balls 24 made of stainless steel and having a diameter of 2.5 mm, by way of example, are added to the uranium powder 20. These balls ensure heat discharge to the wall of the vessel 30 comprising a good heat-conducting material and also counteract sintering. Helical or spiral bimetallic springs have also proved successful instead of the balls made of stainless steel or in addition to them, as inert additives in the uranium powder packing, because they loosen the uranium powder when temperature changes occur by virtue of their unrolling and rolling up again and they also avoid baking and the formation of a passage.

The tight welding of the frits to the wall of the collector and similar tight welding of the gas inlet and outlet pipes and the container ensure that gaps, through which losses could occur due to the high carrier gas velocity, can be effectively avoided.

A further important object of the collector having for example pyrophorous uranium as a storage metal is to collect a special isotope from as many as possible of the separation cycles. If the described separation means is used for example for a fusion experiment, the tritium should be separated from the used fuel of as many individual experiments as possible and then collected. A week seems a practical period for an experiment to last, so that some 10 liters of storage capacity are necessary.

The theoretical sorption capacity of 600 g of uranium amounts to about $25 \times 10^4$ Ci of tritium. In the sorption process from the quickly flowing helium carrier gas the isotope is first built up in the outer layers of the agglomerates of uranium particles which become quickly saturated. It must therefore be ensured that such loading of the outer layers is transferred to the inside, i.e. that as homogenous a "mass" loading as possible of the total reactionable metal occurs. This transposition is achieved by applying temperature gradients, i.e. the border layers are heated for a short time while the inside of the uranium agglomerate remains cool, and the hydrogen isotopes will shift away from the boundary zones. The embodiment of this temperature gradient is supported by the interpolated additives, in particular the stainless steel balls. When the vessel wall 30 is heated for a short time to approximately between 270° and 275° C. by means of an electrically operable heating jacket 32 disposed on the outside, the carrier gas comprising the conductive helium is heated and it transmits at least some of its heat to the stainless steel balls. The latter transmit the heat to the adjacent loose uranium powder and thus cause a hydrogen release appropriate to the temperature. Since pyrophorous uranium is a poor conductor of heat the inner part of the agglomerate remains cooler so that the respective hydrogen isotope is absorbed in accordance with the hydrogen dissociation pressure. An enlarged schematic view of this is shown in the circle in FIG. 2. In this way, the hydrogen loading of the sorption metal is evenly distributed and the reception capacity of the collector is enhanced.

Using such a collector and the above-described packing it is possible to attain complete absorption of up to several hundred milliliters of hydrogen isotopes from the stream of gas.

The described embodiment example may of course be varied in several ways. The stainless steel ball may have a diameter of between 2 and 3 millimeters or may have a diameter outside this range, and a different volume ratio to 1:1 of the active absorbing metal powder and the stainless steel balls or other additives may also be used, e.g. 3:1 and more; generally the filler bodies should be separated by active material.

Other materials may be used in the separation column instead of the gamma-aluminium oxide mentioned above. When using gamma-aluminium oxide the water content is preferably 1 percent by weight; it may, however deviate from this value and be, for example, between 0.5 and 2.5 percent by weight. The added fiber or needle-shaped silicon dioxide members may also have other lengths and diameters, e.g. length between 1 and 3 mm and mean diameter between 0.5 and 0.3 mm, and the share of these fillers can also be increased to up to 5 percent by weight of the aluminium oxide. The values and parameters stated in the description of the embodiment example are, however, preferred.

When operating the means illustrated in FIG. 1 a reversal of the valves may be achieved by means of a programmed control system (not shown) in conjunction with a time control or the detector output signals for the selection of the individual separated isotopes.

When the means is put into operation it is first evacuated and heated and then flushed with helium. Then the membrane compressor MP is put into operation, the helium carrier gas is pumped around and the operating parameters provided for separation, e.g. the temperature of the column, are set.

During this preparation the valves V101, V104, V105, V107 and V111 are open and all other valves are closed so that the carrier gas is pumped from the membrane compressor MP through the column K1 and the detectors D1 and D3. The sample volumes PV1 can be evacuated by means of the pump TP through the pipes with the open valves V301, V302 and V303, while the valves V304 and V305 are closed. Then the valve V301 is closed and the isotope mixture to be separated is fed in from a supply which is formed in the embodiment example according to FIG. 1 by the container TG contained in the rectangle shown by means of a broken line. The the valves V302 and V305 are closed and the means is then ready for the separation process.

For starting a separation process the valve V101 is closed and at the same time the valves V102 and V103 are opened so that the carrier gas removes with it the isotope mixture contained in the sample volume PV1, which is to be separated, and places it as a compact pulse or stopper in the separation column K1. After a certain time, which is constant from charge to charge under prescribed operational conditions and apparatus parameters, the first hydrogen isotope appears at the outlet of the column K1 which is reflected by the detector D1. Then the collector provided for sorption and collection of the respective isotope, e.g. collector A1, is communicated to the carrier gas flow. This may be accomplished either by a time-independent control or by means of the output signal of the detector D1 in a manner which is not described in more detail. For communicating the collector A1, the valve V111 is closed V110 and V11 and V12 are opened so that the gas will now flow through the collector A1 to detector D3 where the respective isotope is then absorbed and removed from the carrier gas. After a certain time or upon control by the output signal of the detector D1 the gas flow is then switched over to the next collector A2 so as to remove and collect the next isotope or isotope mixture from the carrier gas. For this purpose valves V110, V11 and V12 are closed and valve V108 and valves V21 and V22 are opened so that the gas can now flow through the collector A2.

In the same way the collector A3 can be communicated via valve V109 and valves V31 and V32. If more than three isotopes or isotope mixtures are to be removed an appropriate number of collectors and valve arrangements must be provided.

While separation is being carried out by means of column K1, the sample volume PV2 can be filled in an analogous way for preparing a subsequent separation process using column K2. The next charge can then be separated in the same way by means of column K2 while using the valve arrangement associated therewith, which will become immediately clear from the above description. The active separation material is generally a non-metallic particulate material of no essential catalytic activity.

What is claimed is:

1. A means for separating isotopes of hydrogen contained in a gas mixture based on the principles of gas chromatography, comprising a flow passage for a carrier gas containing a feed pump (MP), at least one separation column with a packing, including a fine-grained active separation material, at least one collector (A1), which is controlled so as to be communicated by a valve arrangement, with a packing of a hydrogen-absorbing material, and a valve arrangement for controlling the separation process, characterised in that the separation material is a fine non-metallic material in which inert fibrous fillers are evenly distributed in an amount of not more than 5 percent by volume.

2. A means according to claim 1, characterised in that the fibres consist of silicon dioxide.

3. A means according to claim 2, characterised in that the active separation material is aluminium oxide.

4. A means according to claim 1, characterised in that the active separation material is gamma-aluminium oxide having a water content of approximately 1 percent by weight.

5. A means according to claim 1, characterised in that the fibres have a mean diameter of about 0.1 mm and a mean length 2 mm and that the separation material consists of particles of a size between 60 and 210 microns.

6. A means according to claim 1, characterised in that the fibres account for 0.5 to 2 percent by weight of the separation material.

7. A means according to claim 1, characterised in that the separation material is disposed in a copper pipe.

8. A means according to either of claims 1 or 7, characterised in that the separation material is disposed in a pipe having a diameter of about 50 mm.

9. A means for separating isotopes of hydrogen contained in a gas mixture based on the principle of gas chromatography, comprising a flow passage for a carrier gas containing a feed pump (MP), at least one separation column with a packing, including a fine-grained active separation material, at least one collector (A1) which is controlled so as to be communicated by a valve arrangement, with a packing of a hydrogen-absorbing material, and a valve arrangement for controlling the separation process, characterised in that the packing of the collector contains powdered pyrophorous uranium as absorbing material and coarser particles of a highly conductive material as a filler.

10. A means according to claim 9, characterised in that the packing of the collector contains ball-shaped fillers.

11. A means according to claim 9, characterised in that the fillers consist of balls made of stainless steel.

12. A means according to either of claims 9 or 10, characterised in that the packing of the collector contains bimetallic fillers.

13. A means according to claim 11, characterised in that the bimetallic fillers are spiral or helical.

14. A means according to claim 9, characterised in that the collector is provided with a heating device.

* * * * *